Patented Mar. 13, 1934

1,950,829

UNITED STATES PATENT OFFICE 1,950,829

METHOD OF TREATING VERMICULITE

George Miller Thomson, Caledonia, Ontario, Canada

No Drawing. Application August 10, 1931, Serial No. 556,301

3 Claims. (Cl. 252—1)

This invention relates to a method of treating vermiculite and particularly to the exfoliation thereof to provide layers or sheets of micaceous material of thin section.

In carrying out the invention the vermiculite is crushed in a hammer mill or the like, and preferably screened or otherwise graded to provide portions of more or less uniform size, which can be more efficiently treated separately. Each portion is soaked in water for several hours to permit water to penetrate between the layers of micaceous material. The soaked material from which excess or superficial water is removed centrifugally or otherewise is then placed in a heating chamber where its temperature is quickly raised to a substantial point which may be in the neighbourhood of 1800° F. This causes the layers or sheets of micaceous material to separate from each other in thin sections which are not readily obtainable from mica or vermiculite otherwise treated.

In some cases where the thinnest possible sheets are desired, it may be necessary to repeat the soaking and heating treatment one or more times.

These thin sheets may be further ground in water or oil to provide fine, thin particles adapted for various uses in industry.

Where a plurality of sizes of the thin sheets or flakes are required several portions or grades of the exfoliated material may be mixed together in desired proportions.

This method thus provides for the separation of micaceous sheets into the thinnest possible sections and avoids excessive grinding which tends to pulverize rather than split the sheets.

I claim:

1. A method of treating vermiculite to provide thin sheets of micaceous material, which comprises crushing vermiculite, soaking the same in water, removing therefrom superficial water and heating the material to substantially 1800° F.

2. A method of treating vermiculite, which comprises crushing the vermiculite, grading the same into portions of substantially the same size, soaking each portion in water, removing therefrom superficial water and quickly raising the temperature thereof to abruptly convert the absorbed water into steam and form thin micaceous flakes or sheets.

3. A method of producing thin micaceous sheets or flakes which comprises soaking vermiculite in water, removing superficial water and heating the material to a temperature sufficient to rapidly convert absorbed water into steam.

GEORGE MILLER THOMSON.